United States Patent
Raghavan et al.

(10) Patent No.: US 11,757,508 B1
(45) Date of Patent: Sep. 12, 2023

(54) TECHNIQUES FOR REPORTING TIME-SCALE CAPABILITY INFORMATION IN LEARNING ADAPTIVE BEAM WEIGHTS FOR MILLIMETER WAVE SYSTEMS

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/695,492

(22) Filed: Mar. 15, 2022

(51) Int. Cl.
*H04B 7/06* (2006.01)
*H04B 7/08* (2006.01)
*H04L 5/00* (2006.01)
*H04W 24/02* (2009.01)
*H04W 24/10* (2009.01)

(52) U.S. Cl.
CPC ......... *H04B 7/0617* (2013.01); *H04B 7/0628* (2013.01); *H04B 7/0686* (2013.01); *H04L 5/0051* (2013.01); *H04W 24/02* (2013.01); *H04W 24/10* (2013.01)

(58) Field of Classification Search
CPC .. H04B 7/0617; H04B 7/0628; H04B 7/0686; H04L 5/0051; H04W 24/02; H04W 24/10
See application file for complete search history.

(56) References Cited

U.S. PATENT DOCUMENTS

| | | | |
|---|---|---|---|
| 2016/0337916 A1* | 11/2016 | Deenoo | H04W 36/0094 |
| 2022/0225389 A1* | 7/2022 | Go | H04L 5/0094 |

\* cited by examiner

*Primary Examiner* — David S Huang
(74) *Attorney, Agent, or Firm* — ArentFox Schiff LLP

(57) ABSTRACT

Aspects described herein relate to reporting time-scale capability information in learning adaptive beam weights for millimeter wave systems. In one example, a user equipment (UE) may identify a time-scale at which the UE can learn a set of adaptive beam weights for hybrid beamforming communications. The UE may further transmit a dynamic capability indication including information associated with the time-scale at which the UE can learn the set of one or more adaptive beam weights. In another example, a network entity may receive a dynamic capability indication including information associated with a time-scale at which a UE can estimate a set of adaptive beam weights. The network entity may further identify one or more time-scales associated with a set of reference signals to transmit to the UE for beam weight estimation, and transmit a grant for the set of reference signals for the UE to perform the beam weight estimation.

20 Claims, 7 Drawing Sheets

TECHNIQUES FOR REPORTING TIME-SCALE CAPABILITY INFORMATION IN LEARNING ADAPTIVE BEAM WEIGHTS FOR MILLIMETER WAVE SYSTEMS

TECHNICAL FIELD

Aspects of the present disclosure relate generally to wireless communication systems, and more particularly, to reporting time-scale capability information in learning adaptive beam weights for millimeter wave systems.

DESCRIPTION OF RELATED TECHNOLOGY

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, in some millimeter wave systems, a set of static beam weights may be used to in beamforming applications to steer energy in specific directions. Such static beam weights, however, may not work well in certain conditions. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication at a user equipment (UE) is provided. The method may include identifying a time-scale at which the UE can learn a set of one or more adaptive beam weights for hybrid beamforming communications. The method may further include transmitting a dynamic capability indication including information associated with the time-scale at which the UE can learn the set of one or more adaptive beam weights.

In a further example, an apparatus for wireless communication including a transceiver, a memory configured to store instructions, and at least one processor communicatively coupled with the transceiver and the memory, where the at least one processors are may be configured to identify a time-scale at which the UE can learn a set of one or more adaptive beam weights for hybrid beamforming communications. The at least one processor is further configured to transmit a dynamic capability indication including information associated with the time-scale at which the UE can learn the set of one or more adaptive beam weights.

In a further example, a non-transitory computer-readable medium includes code executable by at least one processor to identify a time-scale at which the UE can learn a set of one or more adaptive beam weights for hybrid beamforming communications, and transmit a dynamic capability indication including information associated with the time-scale at which the UE can learn the set of one or more adaptive beam weights.

According to another example, a method of wireless communication at a network entity is provided. The method may include receiving a dynamic capability indication including information associated with a time-scale at which a UE can estimate a set of adaptive beam weights. The method may further include identifying one or more time-scales associated with a set of reference signals to transmit to the UE for beam weight estimation. The method may further include transmitting a grant for the set of reference signals for the UE to perform the beam weight estimation.

In a further example, an apparatus for wireless communication including a transceiver, a memory configured to store instructions, and at least one processor communicatively coupled with the transceiver and the memory, where the at least one processors are may be configured to receiving a dynamic capability indication including information associated with a time-scale at which a UE can estimate a set of adaptive beam weights. The at least one processor is further configured to identify one or more time-scales associated with a set of reference signals to transmit to the UE for beam weight estimation. The at least one processor is further configured to transmit a grant for the set of reference signals for the UE to perform the beam weight estimation.

In a further example, a non-transitory computer-readable medium includes code executable by at least one processor to receive a dynamic capability indication including information associated with a time-scale at which a UE can estimate a set of adaptive beam weights. The non-transitory computer-readable medium may further include code executable by at least one processor to identify one or more time-scales associated with a set of reference signals to transmit to the UE for beam weight estimation. The non-transitory computer-readable medium may further include code executable by at least one processor to transmit a grant for the set of reference signals for the UE to perform the beam weight estimation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
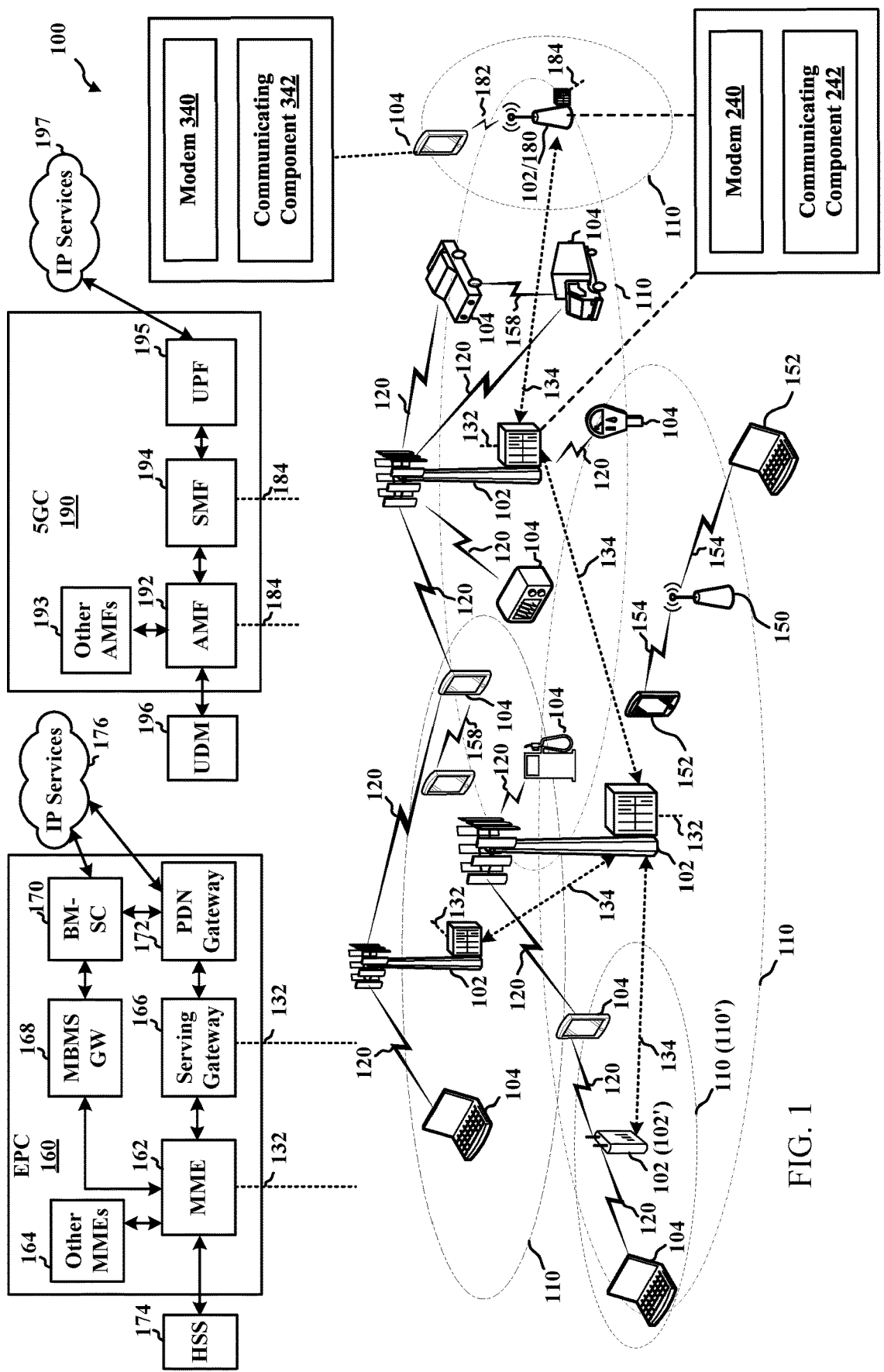
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to user equipments (UEs) reporting time-scale capability information that the UE is able to use for learning adaptive beam weights for systems operating at millimeter wave carrier frequencies and beyond. Millimeter wave systems have developed over time with first-generation systems already commercially deployed in the market. For such systems, the carrier frequencies of interest may be in the '28' and '39' GHz bands. However, upper millimeter wave (>52.6 GHz) bands and sub-Terahertz (>114.25 GHz) bands may also be used as Fifth Generation systems evolve in terms of standardization and deployment. In such systems, the first-generation analog/hybrid beamforming applications may focus on steering energy in specific directions of beamspace (i.e., directional beams). Such an approach can be viewed as a static codebook approach.

As these systems mature, a more general set of adaptive/dynamic beam weights may become relevant, as described herein. The present disclosure enables such a general set of beam weights, which the UE may use to handle issues such as wider angular spreads for the cluster over which propagation can be established from the transmit node to the receive node, multi-beam effects such as multiple lobes across multiple clusters, side lobe control, hand blockage related impairments, and polarization-specific impairments at the UE (i.e., due to UE housing, materials or sensors at the UE).

In contrast to static beam weights, which may be designed a priori, adaptive/dynamic beam weights may benefit from learning a posteriori or on-the-fly. The present disclosure thus concerns time-scales at which such adaptive/dynamic beam weights can be learned by the UE. The present implementations propose dynamic capability signaling to convey the ability of a UE to learn adaptive/dynamic beam weights to another device (i.e., another UE or network entity).

For example, as adaptive/dynamic beam weights may be learned during the course of communications, learning such beam weights can lead to latencies commensurate with antenna array dimensions as compared to static beam weights, which may be determined based on beam characterization and calibration well before beamforming communications. In particular, in one implementation, learning adaptive/dynamic beam weights may utilize a number of independent samples that scale as the square of the antenna array dimensions. The motivation behind this implementation is to estimate the covariance matrix of the effective channel vector seen at the UE side. Note that the covariance matrix may capture the second-order statistical variation across the different entries of the effective vector channel seen at the UE. The number of real degrees of freedom (or independent variables) in an N×N covariance matrix is $N^2$ where N is the array dimension.

Moreover, in applications such as during mobility, the number of independent samples used for beam weight estimation can be significant. For example, if N=5, then 25 independent samples may be used to determine the covariance matrix. If the 25 independent samples correspond to the use of a single independent measurement occurring at every synchronization signal block (SSB), with an SSB period of 20 ms, which may be the default SSB periodicity for the Fifth Generation systems, the process may take 25*20=500 ms, assuming a good quality covariance matrix estimation (i.e., for averaging, consider K*500 ms where K>1). An SSB may include a primary synchronization signal (PSS), a secondary synchronization signal (SSS), and physical broadcast channel (PBCH) information. The UE can obtain physical cell identity, achieve downlink synchronization in a time or frequency domain, and acquire time instants of PBCH channel based on the SSB.

In an example, a speed of v=30 kmph (or 8.33 m/s) during a mobility scenario may represent a spatial displacement of approximately 4.2 meters, which can lead to a change in terms of how the clusters in the channels are seen by the UE. In particular, with that spatial displacement, clusters can be blocked, can fade (i.e., constructively or destructively), or new clusters that are more dominant can appear leading to a non-stationarity in the covariance matrix being estimated. All these effects may become more exaggerated as N increases to, for example, 6 or more (i.e., UE side evolution) or N=64 or more (i.e., customer premises equipment (CPE) side evolution). Array sizes can be large for UEs as carrier frequency increases and/or for CPE use-cases. This can lead to significant latencies as the periodicity of obtaining independent samples can become large.

As such, the present implementations provide noise mitigation techniques where a UE may identify a time-scale at which a set of one or more adaptive beam weights for hybrid beamforming communications can be learned. A time-scale may correspond to a time period over which a certain process may need to be completed for that process to be reliably completed. For example, the time-scale at which adaptive/dynamic beam weights can be learned may correspond to the time period over which the covariance matrix of the effective vector channel at the UE may be estimated so that the beam weights can be inferred from this estimate for subsequent communications with the transmitter node.

The UE may further transmit, to a UE during sidelink scenarios or a network entity, a dynamic capability indication including information associated with the time-scale at which the UE can learn the set of one or more adaptive/dynamic beam weights.

Particular implementations of the subject matter described in this disclosure can be implemented to realize one or more of the following potential advantages. The disclosed techniques mitigate an increase in communication latency while experiencing an signal-to-noise ratio (SNR) gain. Specifically, the techniques described herein may provide a flexible approach than enables a UE to facilitate noise reduction based on identifying a time-scale at which a set of one or more adaptive beam weights for hybrid beamforming communications can be learned.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as UE 104 of the wireless communication system may have a modem 340 and communicating component 342 for identifying a time-scale at which the UE can learn a set of one or more adaptive beam weights for hybrid beamforming communications, and transmitting a dynamic capability indication including information associated with the time-scale at which the UE can learn the set of one or more adaptive beam weights, as described herein. Though a UE 104 is shown as having the modem 340 and communicating component 342, this is one illustrative example, and substantially any node or type of node may include a modem 340 and communicating component 342 for providing corresponding functionalities described herein.

In another example, some nodes and/or network entities such as base station 102/gNB 180, may have a modem 240 and communicating component 242 for identifying grants associated with reference signals based on time-scales identified by UE 104, as described herein. Though a base station 102/gNB 180 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a AMF 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 3:
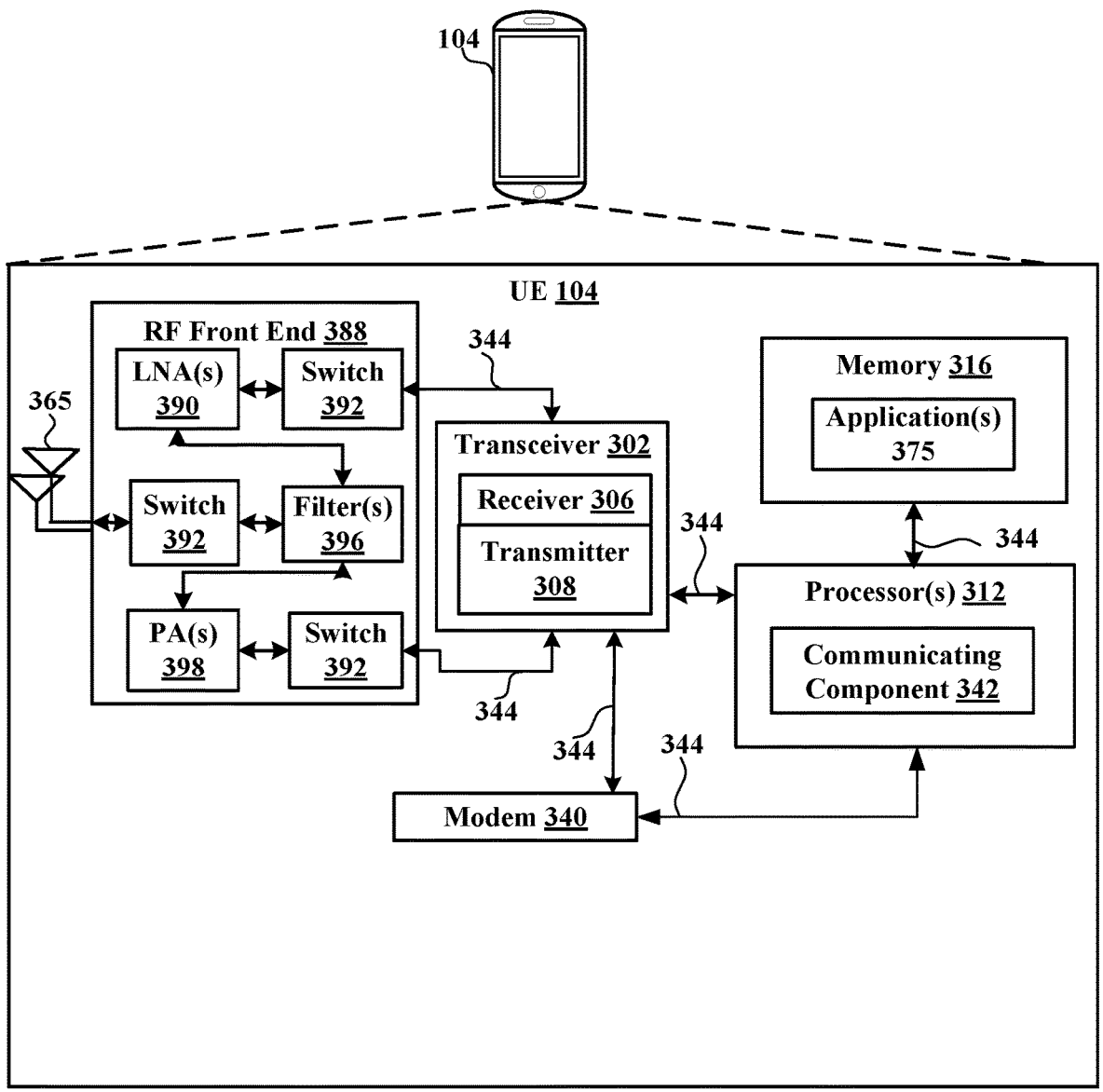
FIG. 3 is a block diagram illustrating an example of a user equipment (UE), in accordance with various aspects of the present disclosure.
Figure 4:
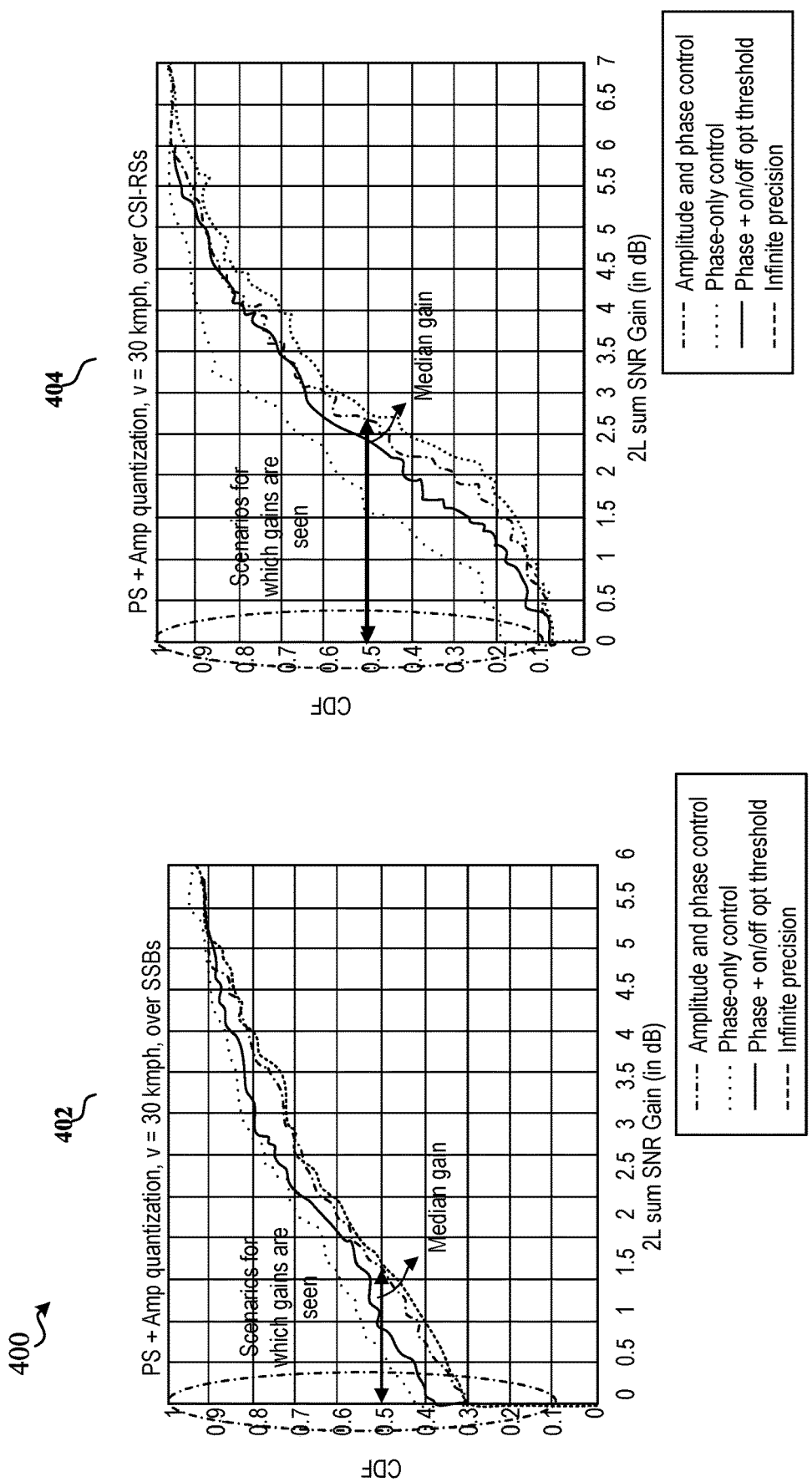
FIG. 4 illustrates graphical diagrams of example signal-to-noise ratio (SNR) gain with dynamic beam weights, in accordance with various aspects of the present disclosure.
Figure 5:
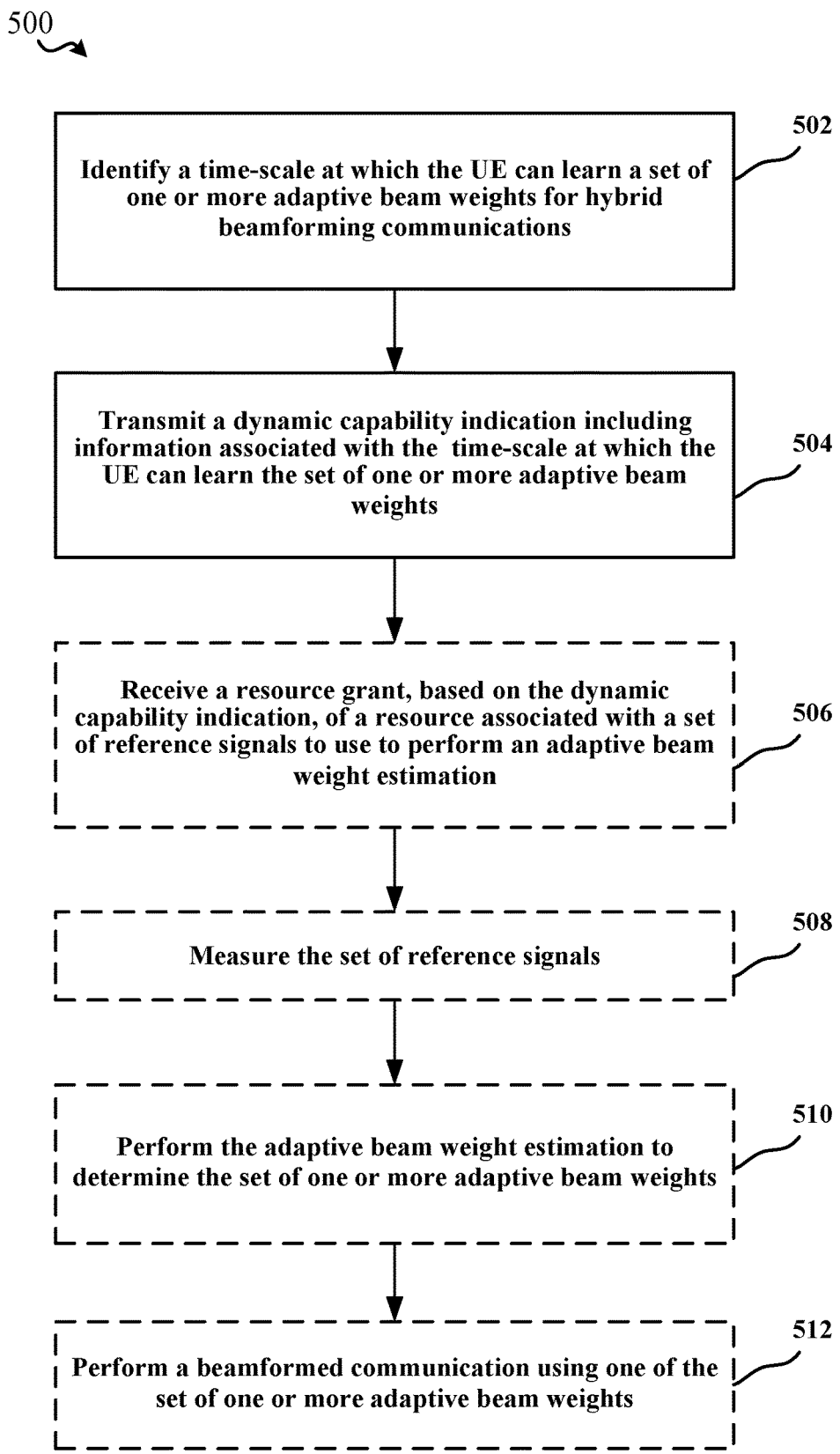
FIG. 5 is a flow chart illustrating an example of a method for wireless communications at a UE in accordance with various aspects of the present disclosure.
Figure 6:
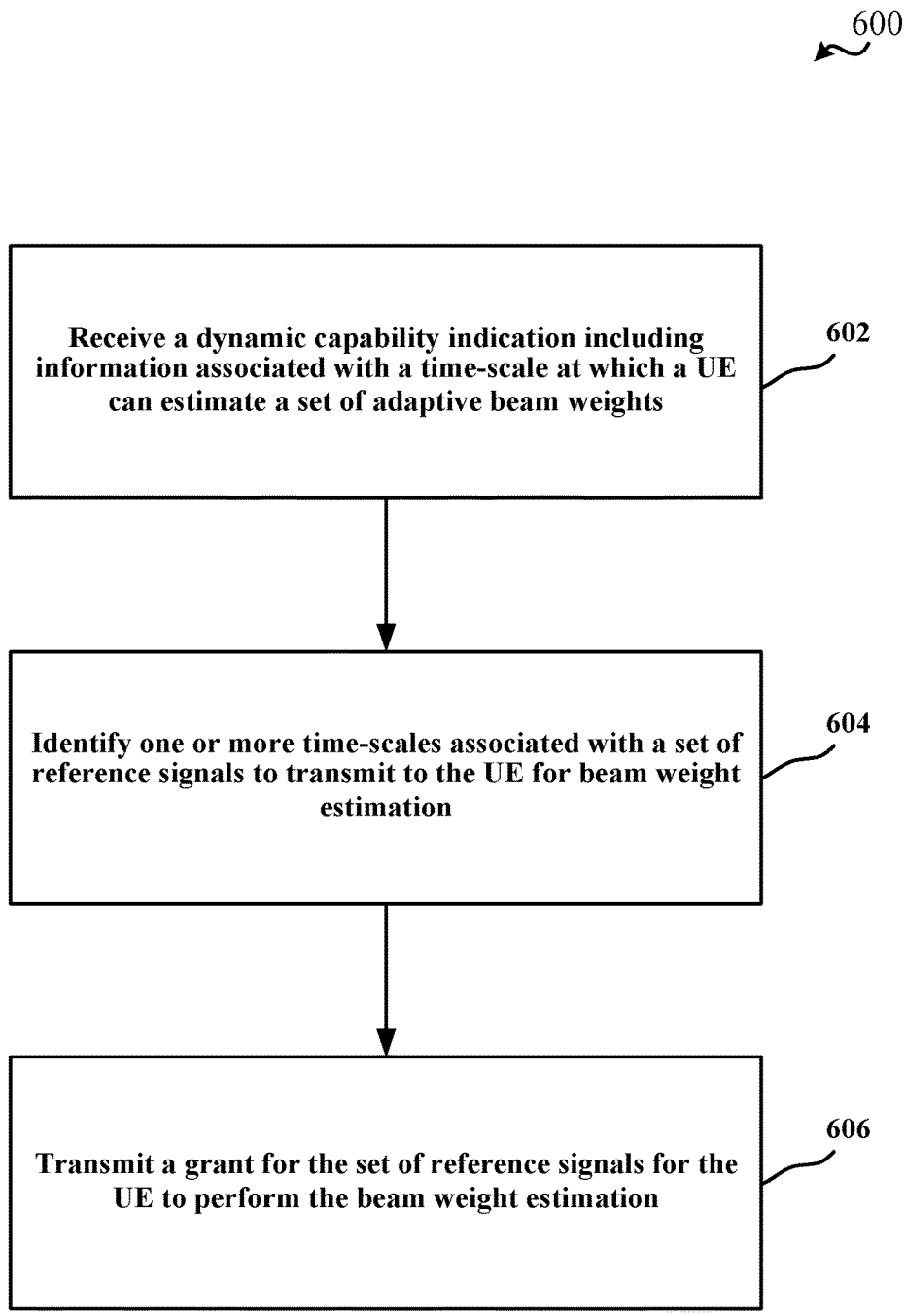
FIG. 6 is a flow chart illustrating another example of a method for wireless communications at a network entity in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
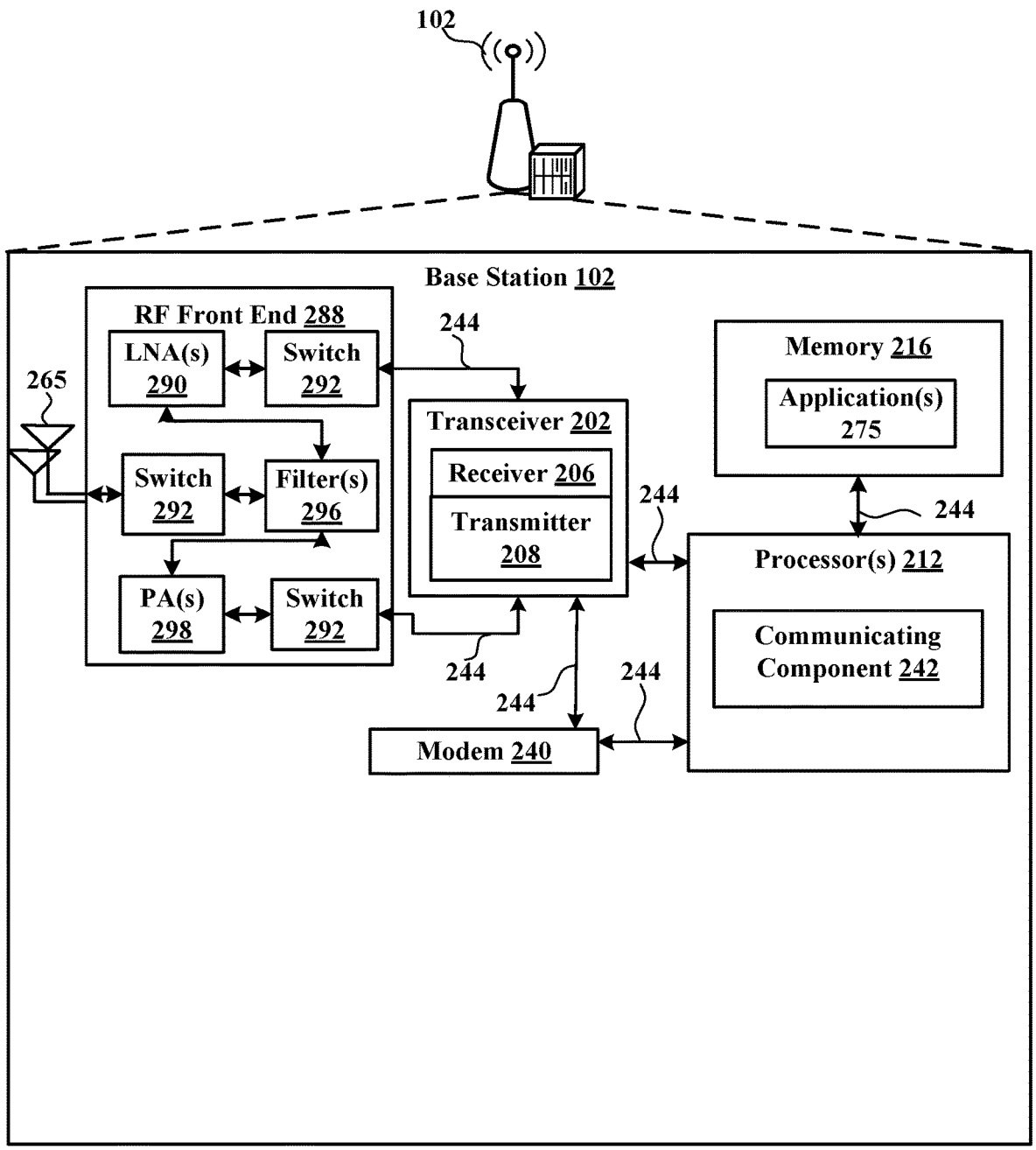
FIG. 2 is a block diagram illustrating an example of a network entity (also referred to as a base station), in accordance with various aspects of the present disclosure.

Referring to FIG. 2, one example of an implementation of a node or network device, such as base station 102 (e.g., a base station 102 and/or gNB 180, as described above, or even a UE such as in a sidelink communication scenario) may include a variety of components, some of which have already been described above and are described further herein, including components such as one or more processors 212 and memory 216 and transceiver 202 in communication via one or more buses 244, which may operate in conjunction with modem 240 and/or communicating component 242 for identifying one or more time-scales associated with a set of reference signals to transmit to the UE for beam weight estimation.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or communicating component 342 for identifying a time-scale at which a set of one or more adaptive beam weights for hybrid beamforming communications can be learned.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 7. Similarly, the memory 316 may correspond to the memory described in connection with the base station in FIG. 7.

Further, FIG. 4 is a diagram of an example signal-to-noise ratio (SNR) gain with adaptive/dynamic beam weights across two implementations, which provides an improvement over the use of static beam weights. Specifically, a first implementation 402 shows a phase and amplitude quantization for a mobility scenario (i.e., v=30 kmph) over SSBs. A second implementation shows a phase and amplitude quantization for the same mobility scenario (i.e., v=30 kmph) over channel state information reference signals (CSI-RS), which may be used to measure the characteristics of a communication channel for modulation, code rate, and/or beamforming purposes. The Y-axis may represent the cumulative distribution function, which may be a representation of a probability that a random variable 'X' will take a value smaller than x. The X-axis may represent a sum SNR gain over two polarization layers with a set of adaptive/dynamic beam weights relative to the use of static beam weights.

The example illustration of sum SNR gain over two layers with adaptive/dynamic beam weights over static beam weights for a 4×1 dual-pol array with v=30 kmph mobility demonstrates a scenario where the array may be impaired with a loose hand holding-based blockage. Different schemes may be used for quantizing the adaptive/dynamic beam weights including 4-bit amplitude and 3-bit phase control, 3-bit phase-only control, 3-bit phase control plus on/off amplitude control of antenna elements (i.e., with ON being used when the amplitude of a certain antenna element exceeds an optimized signal strength threshold, and OFF otherwise) and an ideal/infinite precision benchmark.

The first implementation 402 shows that gain with adaptive/dynamic beam weights may be seen for approximately 70% of channel realizations with a median gain of approximately 1.5 dB when beam weights are estimated over 20 ms SSBs. The second implementation 404 shows that gain can be seen for approximately 90% of channel realizations with a median gain of approximately 2.5 dB when beam weights are estimated over CSI-RSs (i.e., which are adjacent symbols in a subframe). In other words, depending on the time-scale at which adaptive/dynamic beam weights are estimated, more/less gains can be seen.

In a first implementation, a UE can indicate to another device in the network (i.e., a network device such as a gNB or another UE) a dynamic capability field that carries information on the time-scales at which adaptive/dynamic beam weights can be estimated for certain accepted performance gains. The adaptive/dynamic beam weights can be used in regular/access setting or in sidelink settings. Adaptive/dynamic beam weights may be used to address at least one of wider angular spreads for the cluster over which beamformed communication may be established, multi-beam effects such as multiple lobes across multiple clusters, side lobe control, hand blockage related impairments, polarization-specific impairments at the UE (i.e., due to UE housing, materials/sensors at the UE). The reported time-scale may be reflective of hardware capability at the UE (i.e., beam switching latencies associated with the device for learning of beam weights). The reported time-scales may be different at different UE speeds and hence can be dynamic.

In a second implementation, alternate metrics can be conveyed to capture the time-scales at which adaptive beam weights can be learned. For example, the number of independent beam measurements that can be performed in a fixed time-period may be used as a metric. The number of independent beam measurements may be reflective of a number of radio frequency chains available, a number of sub-symbol level measurements that can be made allowing a speeding up of the process of beam measurements. Further, the number of independent beam measurements may be reflective of an availability of a number of chains that do not incorporate mixers, analog-to-digital converter (ADC), digital-to-analog converter (DAC), intermediate frequency (IF) components in a superheterodyne architecture, but may allow independent sensing measurements (e.g., wake-up radio (WUR), self-steering array-type RF circuitry). Further, a time-period of interest may be one SSB period (e.g., 20 ms) or even one symbol period. An alternate metric that can be reported may include a maximum speed at which reliable adaptive/dynamic beam weights can be estimated for a certain available UE capability.

In a third implementation, a gNB can determine the time-scales at which reference signals may be offered for adaptive/dynamic beam weight training based on reported UE's dynamic capability.

Turning now to FIGS. 5 and 6, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 1, 2, 4 and/or 7, as described herein, a specially-programmed processor, a processor executing specially-programmed software or computer-readable media, or by any other combination of a hardware component and/or a software component capable of performing the described actions or functions.

FIG. 5 illustrates a flow chart of an example of a method 500 for wireless communication at a UE, such as the first network entity 104. In an example, a UE 104 can perform the functions described in method 500 using one or more of the components described in FIGS. 1, 3, 4, and 7. It should be noted that the dashed-line boxes in FIG. 5 indication optional actions.

At block 502, the method 500 may identify a time-scale at which the UE can learn a set of one or more adaptive beam weights for hybrid beamforming communications. In an aspect, the communicating component 342, e.g., in conjunction with processor(s) 312, memory 316, and/or transceiver 302, may be configured to identify a time-scale at which the UE can learn a set of one or more adaptive beam weights for hybrid beamforming communications. Thus, the UE 104, the processor(s) 312, the communicating component 342 or one of its subcomponents may define the means for identifying a time-scale at which the UE can learn a set of one or more adaptive beam weights for hybrid beamforming communications. For example, the UE 104 may, via the communicating component 342, select a time-scale demonstrating a UE state (i.e., hardware capabilities or UE speed) that can be used for adapting configurable the amplitude and phases of beams in beamforming communications. Further, for example, the identifying at block 502 may be performed to mitigate an increase in communication latency and experience an SNR gain.

In some aspects, the set of one or more adaptive beam weights may be associated with a network access procedure or a sidelink access procedure.

In some aspects, the set of one or more adaptive beam weights may improve the hybrid beamforming communications to address at least one of an angular spread associated with a cluster in a channel matrix between the UE and a network entity, a beam pattern corresponding to a multi-beam and associated with generated multiple main lobes across multiple clusters in a channel, a side lobe control, a hand blockage impairment, or a polarization-specific impairment at the UE.

In some aspects, the time-scale may include a first time-scale associated with a first UE velocity or speed, and although not shown, the method 500 may further include identifying a second time-scale associated with a second UE velocity or speed, and transmitting an additional capability indication including information associated with the second time-scale.

In some aspects, the time-scale may be a function of a UE speed or velocity.

In some aspects, the time-scale may correspond to a single SSB period or a symbol period.

At block 504, the method 500 may transmit a dynamic capability indication including information associated with the time-scale at which the UE can learn the set of one or more adaptive beam weights. In an aspect, the communicating component 342, e.g., in conjunction with processor(s) 312, memory 316, and/or transceiver 302, may be configured to transmit a dynamic capability indication including information associated with the time-scale at which the UE can learn the set of one or more adaptive beam weights. Thus, the UE 104, the processor(s) 312, the communicating component 342 or one of its subcomponents may define the means for transmitting a dynamic capability indication including information associated with the time-scale at which the UE can learn the set of one or more adaptive beam weights. For example, the UE 104 may transmit, via the transceiver 302 and RF front end 388, dynamic capability indication including information associated with the time-scale, to another UE in a sidelink scenario or to a network entity 102, for grant determination purposes. In other words, the dynamic capability indication enables a network entity to determine one or more sets of resources to use to send references signals to the UE so that the UE can measure performance and determine one or more suitable sets of adaptive/dynamic beam weights.

In some aspects, the information associated with the time-scale may include one or more UE hardware or software capabilities including at least one of a beam switching latency or beam weight estimation latency.

In some aspects, the information associated with the time-scale may include a number of beam measurements that can be performed in a fixed time period that is configured by a network entity or the UE.

In some aspects, the information associated with the time-scale may include a number of available radio frequency chains including a mixers, an analog-to digital and digital-to-analog converter, a power and low-noise amplifier, or a switch.

In some aspects, the information associated with the time-scale may include a number of sub-symbol level measurements that can be made by the UE.

In some aspects, the information associated with the time-scale may include a number of available receive chains that allow independent sensing measurements, the number of available receive chains include at least one of a wake-up receiver or self-steering array circuitry.

In some aspects, the information associated with the time-scale may include a maximum speed for beam weight estimation that meets a performance threshold in terms of achievable rate.

At block 506, the method 500 may receive a resource grant, based on the dynamic capability indication, of a resource associated with a set of reference signals to use to perform an adaptive beam weight estimation. In an aspect, the communicating component 342, e.g., in conjunction with processor(s) 312, memory 316, and/or transceiver 302, may be configured to receive a resource grant, based on the dynamic capability indication, of a resource associated with a set of reference signals to use to perform an adaptive beam weight estimation. Thus, the UE 104, the processor(s) 312, the communicating component 342 or one of its subcomponents may define the means for receiving a resource grant, based on the dynamic capability indication, of a resource associated with a set of reference signals to use to perform an adaptive beam weight estimation. For example, after transmitting the dynamic capability indication, the UE 104 may receive, via the transceiver 302 and RF front end 388, the resource grant from another UE or the network entity.

At block 508, the method 500 may measure the set of reference signals. In an aspect, the communicating component 342, e.g., in conjunction with processor(s) 312, memory 316, and/or transceiver 302, may be configured to measure the set of reference signals. Thus, the UE 104, the processor(s) 312, the communicating component 342 or one of its subcomponents may define the means for measuring the set of reference signals. For example, the UE 104 may measure, via the transceiver 302 and RF front end 388, the set of reference signals.

At block 510, the method 500 may perform the adaptive beam weight estimation to determine the set of one or more adaptive beam weights. In an aspect, the communicating component 342, e.g., in conjunction with processor(s) 312, memory 316, and/or transceiver 302, may be configured to perform the adaptive beam weight estimation to determine the set of one or more adaptive beam weights. Thus, the UE 104, the processor(s) 312, the communicating component 342 or one of its subcomponents may define the means for performing the adaptive beam weight estimation to determine the set of one or more adaptive beam weights. For example, the UE 104 may, via the communicating component 342, estimate the adaptive beam weight according to the identified time-scale to mitigate an increase in communication latency and experience an SNR gain.

At block 512, the method 500 may perform a beamformed communication using one of the set of one or more adaptive beam weights. In an aspect, the communicating component 342, e.g., in conjunction with processor(s) 312, memory 316, and/or transceiver 302, may be configured to perform a beamformed communication using one of the set of one or more adaptive beam weights. Thus, the UE 104, the processor(s) 312, the communicating component 342 or one of its subcomponents may define the means for performing a beamformed communication using one of the set of one or more adaptive beam weights. For example, the UE 104 may perform, via the transceiver 302 and RF front end 388 and antennas 365, use the one or more adaptive beam weights demonstrating SNR gain to conduct the beamformed communication FIG. 6 illustrates a flow chart of an example of a method 600 for wireless communication at a network entity. In an example, a base station 102 can perform the functions described in method 500 using one or more of the components described in FIGS. 1, 2, 4, and 7.

At block 602, the method 600 may receive a dynamic capability indication including information associated with a time-scale at which a user equipment (UE) can estimate a set of adaptive beam weights. In an aspect, the communicating component 242, e.g., in conjunction with processor(s) 212, memory 216, and/or transceiver 202, may be configured to receive a dynamic capability indication including information associated with a time-scale at which a user equipment (UE) can estimate a set of adaptive beam weights. Thus, the base station 102, the processor(s) 212, the communicating component 242 or one of its subcomponents may define the means for receiving a dynamic capability indication including information associated with a time-scale at which a user equipment (UE) can estimate a set of adaptive beam weights.

In some aspects, the information associated with the time-scale may include one or more UE hardware or software capabilities including at least one of a beam switching latency or beam weight estimation latency.

In some aspects, the information associated with the time-scale may include a number of beam measurements that can be performed in a fixed time period that is configured by the network entity or the UE.

In some aspects, the information associated with the time-scale may include a number of available radio frequency chains including a mixers, an analog-to digital and digital-to-analog converter, a power and low-noise amplifier, or a switch.

In some aspects, the information associated with the time-scale may include a number of available receive chains that allow independent sensing measurements, the number of available receive chains include at least one of a wake-up receiver or self-steering array circuitry.

In some aspects, the time-scale may correspond to a single SSB period or a symbol period.

In some aspects, the information associated with the time-scale may include a maximum speed for beam weight estimation that meets a performance threshold in terms of achievable rate.

At block 604, the method 600 may identify one or more time-scales associated with a set of reference signals to transmit to the UE for beam weight estimation. In an aspect, the communicating component 242, e.g., in conjunction with processor(s) 212, memory 216, and/or transceiver 202, may be configured to identify one or more time-scales associated with a set of reference signals to transmit to the UE for beam weight estimation. Thus, the base station 102, the processor(s) 212, the communicating component 242 or one of its subcomponents may define the means for identifying one or more time-scales associated with a set of reference signals to transmit to the UE for beam weight estimation.

At block 606, the method 600 may transmit a grant for the set of reference signals for the UE to perform the beam weight estimation. In an aspect, the communicating component 242, e.g., in conjunction with processor(s) 212, memory 216, and/or transceiver 202, may be configured to transmit a grant for the set of reference signals for the UE to perform the beam weight estimation. Thus, the base station 102, the processor(s) 212, the communicating component 242 or one of its subcomponents may define the means for transmitting a grant for the set of reference signals for the UE to perform the beam weight estimation.

Figure 7:
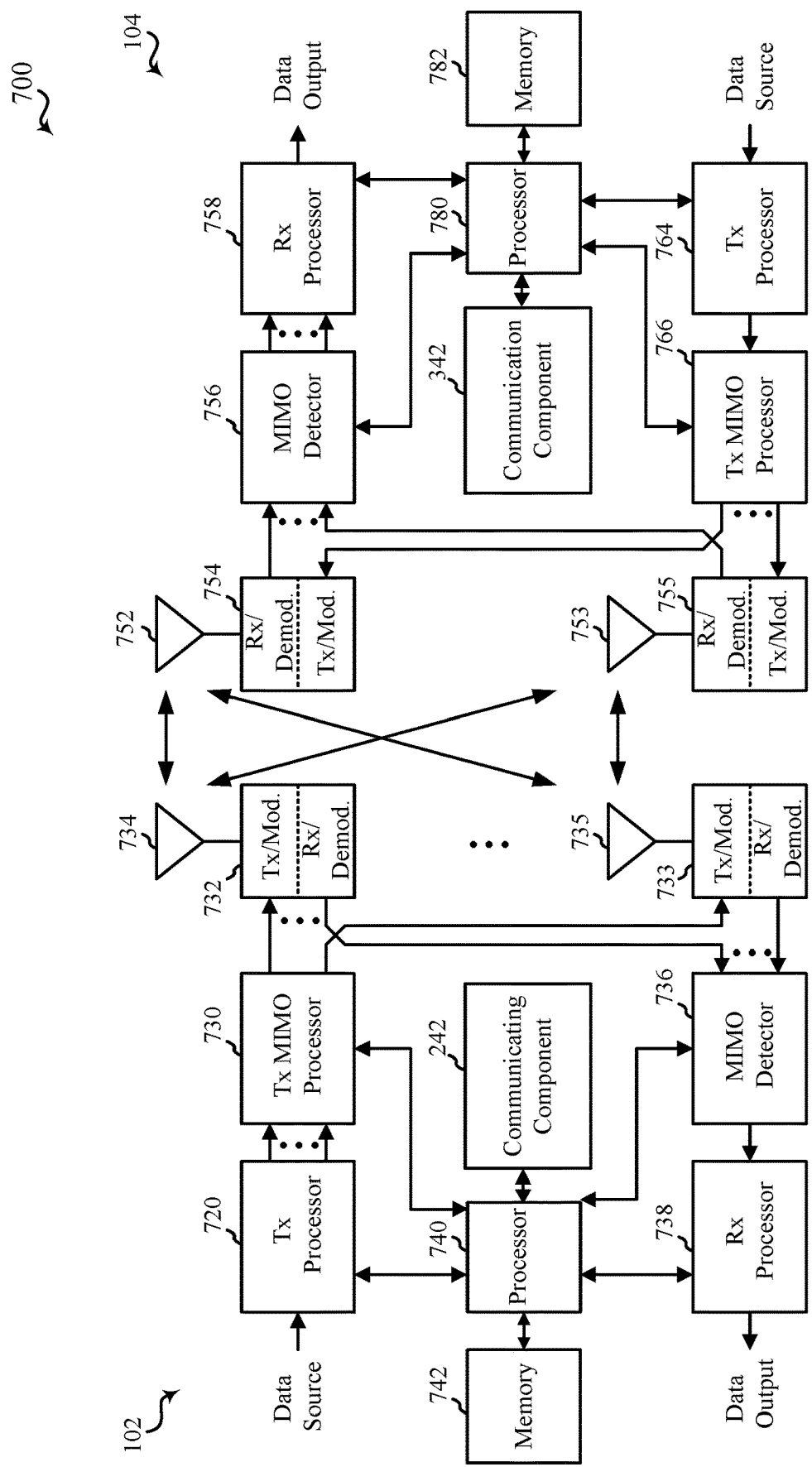
FIG. 7 is a block diagram illustrating an example of a MIMO communication system including a base station and a UE, in accordance with various aspects of the present disclosure.

FIG. 7 is a block diagram of a MIMO communication system 700 including a base station 102, which may be acting as a network device, and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 980, or memory 982.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

Some Additional Examples

The aspects described herein additionally include one or more of the following aspect examples described in the following numbered clauses.

1. A method of wireless communication at a user equipment (UE), comprising:
identifying a time-scale at which the UE can learn a set of one or more adaptive beam weights for hybrid beamforming communications; and
transmitting a dynamic capability indication including information associated with the time-scale at which the UE can learn the set of one or more adaptive beam weights.

2. The method of clause 1, further comprising:
receiving a resource grant, based on the dynamic capability indication, of a resource associated with a set of reference signals to use to perform an adaptive beam weight estimation.

3. The method of clause 1 to clause 2, further comprising:
measuring the set of reference signals;
performing the adaptive beam weight estimation to determine the set of one or more adaptive beam weights; and
performing a beamformed communication using one of the set of one or more adaptive beam weights.

4. The method of clause 1 to clause 3, wherein the set of one or more adaptive beam weights is associated with a network access procedure or a sidelink access procedure.

5. The method of claim 1 to clause 4, wherein the set of one or more adaptive beam weights improve the hybrid beamforming communications to address at least one of:

an angular spread associated with a cluster in a channel matrix between the UE and a network entity;

a beam pattern corresponding to a multi-beam and associated with generated multiple main lobes across multiple clusters in a channel;

a side lobe control;

a hand blockage impairment; or a polarization-specific impairment at the UE.

6. The method of clause 1 to clause 5, wherein the information associated with the time-scale includes one or more UE hardware or software capabilities including at least one of a beam switching latency or beam weight estimation latency.

7. The method of clause 1 to clause 6, wherein the time-scale comprises a first time-scale associated with a first UE velocity or speed, the method further comprising:

identifying a second time-scale associated with a second UE velocity or speed; and transmitting an additional capability indication including information associated with the second time-scale.

8. The method of clause 1 to clause 7, wherein the time-scale is a function of a UE speed or velocity.

9. The method of clause 1 to clause 8, wherein the information associated with the time-scale includes a number of beam measurements that can be performed in a fixed time period that is configured by a network entity or the UE.

10. The method of clause 1 to clause 9, wherein the information associated with the time-scale includes a number of available radio frequency chains including a mixers, an analog-to digital and digital-to-analog converter, a power and low-noise amplifier, or a switch.

11. The method of clause 1 to clause 10, wherein the information associated with the time-scale includes a number of sub-symbol level measurements that can be made by the UE.

12. The method of clause 1 to clause 11, wherein the information associated with the time-scale includes a number of available receive chains that allow independent sensing measurements, the number of available receive chains include at least one of a wake-up receiver or self-steering array circuitry.

13. The method of clause 1 to clause 12, wherein the time-scale corresponds to a single synchronization signal block (SSB) period or a symbol period.

14. The method of clause 1 to clause 13, wherein the information associated with the time-scale includes a maximum speed for beam weight estimation that meets a performance threshold in terms of achievable rate.

15. A method of wireless communication at a network entity, comprising:

receiving a dynamic capability indication including information associated with a time-scale at which a user equipment (UE) can estimate a set of adaptive beam weights;

identifying one or more time-scales associated with a set of reference signals to transmit to the UE for beam weight estimation; and transmitting a grant for the set of reference signals for the UE to perform the beam weight estimation.

16. The method of clause 15, wherein the information associated with the time-scale includes one or more UE hardware or software capabilities including at least one of a beam switching latency or beam weight estimation latency.

17. The method of clause 15 to clause 16, wherein the information associated with the time-scale includes a number of beam measurements that can be performed in a fixed time period that is configured by the network entity or the UE.

18. The method of clause 15 to clause 17, wherein the information associated with the time-scale includes a number of available radio frequency chains including a mixers, an analog-to digital and digital-to-analog converter, a power and low-noise amplifier, or a switch.

19. The method of clause 15 to clause 18, wherein the information associated with the time-scale includes a number of sub-symbol level measurements that can be made by the UE.

20. The method of clause 15 to clause 19, wherein the information associated with the time-scale includes a number of available receive chains that allow independent sensing measurements, the number of available receive chains include at least one of a wake-up receiver or self-steering array circuitry.

21. The method of clause 15 to clause 20, wherein the time-scale corresponds to a single synchronization signal block (SSB) period or a symbol period.

22. The method of clause 15 to clause 21, wherein the information associated with the time-scale includes a maximum speed for beam weight estimation that meets a performance threshold in terms of achievable rate.

23. An apparatus for wireless communication, comprising:

a transceiver;

a memory configured to store instructions; and one or more processors communicatively coupled with the transceiver and the memory, wherein the one or more processors are configured to execute the instructions to perform the operations of one or more methods in clause 1 to clause 14.

24. A non-transitory computer-readable medium, comprising code executable by one or more processors to perform the operations of one or more methods in clause 1 to clause 14.

25. An apparatus for wireless communication, comprising:

a transceiver;

a memory configured to store instructions; and one or more processors communicatively coupled with the transceiver and the memory, wherein the one or more processors are configured to execute the instructions to perform the operations of one or more methods in clause 14 to clause 22.

26. A non-transitory computer-readable medium, comprising code executable by one or more processors to perform the operations of one or more methods in clause 14 to clause 22.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
   identifying a time-scale at which the UE can learn a set of one or more adaptive beam weights for hybrid beamforming communications; and
   transmitting a dynamic capability indication including information associated with the time-scale at which the UE can learn the set of one or more adaptive beam weights.

2. The method of claim 1, further comprising:
   receiving a resource grant, based on the capability indication, of a resource associated with a set of reference signals to use to perform an adaptive beam weight estimation.

3. The method of claim 2, further comprising:
   measuring the set of reference signals;
   performing the adaptive beam weight estimation to determine the set of one or more adaptive beam weights; and
   performing a beamformed communication using one of the set of one or more adaptive beam weights.

4. The method of claim 1, wherein the set of one or more adaptive beam weights is associated with a network access procedure or a sidelink access procedure.

5. The method of claim 1, wherein the set of one or more adaptive beam weights improve the hybrid beamforming communications to address at least one of:
   an angular spread associated with a cluster in a channel matrix between the UE and a network entity;
   a beam pattern corresponding to a multi-beam and associated with generated multiple main lobes across multiple clusters in a channel;
   a side lobe control;
   a hand blockage impairment; or
   a polarization-specific impairment at the UE.

6. The method of claim 1, wherein the information associated with the time-scale includes one or more UE hardware or software capabilities including at least one of a beam switching latency or beam weight estimation latency.

7. The method of claim 1, wherein the time-scale comprises a first time-scale associated with a first UE velocity or speed, the method further comprising:

identifying a second time-scale associated with a second UE velocity or speed; and transmitting an additional capability indication including information associated with the second time-scale.

8. The method of claim 1, wherein the time-scale is a function of a UE speed or velocity.

9. The method of claim 1, wherein the information associated with the time-scale includes a number of beam measurements that can be performed in a fixed time period that is configured by a network entity or the UE.

10. The method of claim 1, wherein the information associated with the time-scale includes a number of available radio frequency chains including a mixers, an analog-to-digital and digital-to-analog converter, a power and low-noise amplifier, or a switch.

11. The method of claim 1, wherein the information associated with the time-scale includes a number of sub-symbol level measurements that can be made by the UE.

12. The method of claim 1, wherein the information associated with the time-scale includes a number of available receive chains that allow independent sensing measurements, the number of available receive chains include at least one of a wake-up receiver or self-steering array circuitry.

13. The method of claim 1, wherein the time-scale corresponds to a single synchronization signal block (SSB) period or a symbol period.

14. The method of claim 1, wherein the information associated with the time-scale includes a maximum speed for beam weight estimation that meets a performance threshold in terms of achievable rate.

15. An apparatus for wireless communication, comprising:
a transceiver;
a memory configured to store instructions; and
at least one processor communicatively coupled with the transceiver and the memory, wherein the at least one processor is configured to:
identify a time-scale at which the UE can learn a set of one or more adaptive beam weights for hybrid beamforming communications; and
transmit a dynamic capability indication including information associated with the time-scale at which the UE can learn the set of one or more adaptive beam weights.

16. The apparatus of claim 15, wherein the at least one processor is further configured to:
receive a resource grant, based on the capability indication, of a resource associated with a set of reference signals to use to perform an adaptive beam weight estimation.

17. The apparatus of claim 16, wherein the at least one processor is further configured to:
measure the set of reference signals;
perform the adaptive beam weight estimation to determine the set of one or more adaptive beam weights; and
perform a beamformed communication using one of the set of one or more adaptive beam weights.

18. The apparatus of claim 15, wherein the set of one or more adaptive beam weights is associated with a network access procedure or a sidelink access procedure.

19. The apparatus of claim 15, wherein the time-scale is a function of a UE speed or velocity.

20. A non-transitory computer-readable medium including code executable by at least one processor to:
identify a time-scale at which the UE can learn a set of one or more adaptive beam weights for hybrid beamforming communications; and
transmit a dynamic capability indication including information associated with the time-scale at which the UE can learn the set of one or more adaptive beam weights.

* * * * *